(12) United States Patent
Yamaguchi

(10) Patent No.: US 12,462,361 B2
(45) Date of Patent: Nov. 4, 2025

(54) IMAGE PROCESSING DEVICE, IMAGE PROCESSING METHOD, PROGRAM, AND RECORDING MEDIUM

(71) Applicant: FUJIFILM Corporation, Tokyo (JP)

(72) Inventor: Yoshitaka Yamaguchi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 590 days.

(21) Appl. No.: 18/047,959

(22) Filed: Oct. 19, 2022

(65) Prior Publication Data

US 2023/0126712 A1 Apr. 27, 2023

(30) Foreign Application Priority Data

Oct. 25, 2021 (JP) ................. 2021-173831

(51) Int. Cl.
*G06T 7/00* (2017.01)
*G06V 10/74* (2022.01)
*G06V 20/50* (2022.01)
*G06V 40/16* (2022.01)

(52) U.S. Cl.
CPC .......... *G06T 7/0002* (2013.01); *G06V 10/761* (2022.01); *G06V 20/50* (2022.01); *G06V 40/161* (2022.01); *G06T 2207/20081* (2013.01); *G06T 2207/30201* (2013.01)

(58) Field of Classification Search
CPC ......... G06T 7/0002; G06T 2207/20081; G06T 2207/30201; G06T 2207/30168; G06V 10/761; G06V 20/50; G06V 40/161
USPC .................................................. 382/100, 155
See application file for complete search history.

(56) References Cited

U.S. PATENT DOCUMENTS

| | | | |
|---|---|---|---|
| 6,289,112 B1 * | 9/2001 | Jain | G06V 40/1347 |
| | | | 382/116 |
| 6,771,836 B2 * | 8/2004 | Lawton | G06V 20/62 |
| | | | 382/172 |
| 2014/0093174 A1 * | 4/2014 | Zhang | G06F 16/5854 |
| | | | 382/190 |

FOREIGN PATENT DOCUMENTS

| | | | | |
|---|---|---|---|---|
| CN | 112102147 A | * | 12/2020 | G06T 7/194 |
| JP | 2013-012906 A | | 1/2013 | |
| WO | WO-2019105297 A | * | 6/2019 | H04N 23/62 |

* cited by examiner

*Primary Examiner* — Sheela C Chawan
(74) *Attorney, Agent, or Firm* — Studebaker Brackett PLLC

(57) ABSTRACT

Provided are an image processing device, an image processing method, a program, and a recording medium for appropriately evaluating blurring of an image according to a background in the image.

The image processing device of an embodiment of the present invention includes a processor, and the processor acquires an image, specifies a subject region in which a selected subject is captured and a background region except for the subject region, in the image, calculates a difference between a degree of blurring in the subject region and a degree of blurring in the background region, acquires information as to whether or not an imaging location of the image is outdoors, and calculates an evaluation value regarding blurring of the image on the basis of the difference and the information.

18 Claims, 6 Drawing Sheets

| TARGET IMAGE | SCORE s FOR SUBJECT REGION | SCORE t FOR BACKGROUND REGION | OUTDOOR DEGREE INFORMATION u | ABSOLUTE VALUE $|s-t|$ OF DIFFERENCE IN SCORE | EVALUATION VALUE v |
|---|---|---|---|---|---|
| IMAGE A | 0.1 | 0.1 | 0.9 | 0 | 0.9 |
| IMAGE B | 0.1 | 0.1 | 0.1 | 0 | 0.5 |
| IMAGE C | 0.1 | 0.9 | 0.9 | 0.8 | 0.94 |
| IMAGE D | 0.1 | 0.9 | 0.1 | 0.8 | 0.86 |
| IMAGE E | 0.9 | 0.1 | 0.9 | 0.8 | 0.54 |
| IMAGE F | 0.9 | 0.1 | 0.1 | 0.8 | 0.46 |
| IMAGE G | 0.9 | 0.9 | 0.9 | 0 | 0.5 |
| IMAGE H | 0.9 | 0.9 | 0.1 | 0 | 0.1 |

IMAGE PROCESSING DEVICE, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2021-173831, filed on Oct. 25, 2021. The above application is hereby expressly incorporated by reference, in its entirety, into the present application.

BACKGROUND OF THE INVENTION

1. Field of the Invention

The present invention relates to an image processing device, an image processing method, a program, and a recording medium, and particularly to an image processing device, an image processing method, a program, and a recording medium for evaluating blurring of an image.

2. Description of the Related Art

A degree of blurring of a captured image is an important factor in evaluating image quality of the image. The degree of blurring in each part of the image changes depending on imaging conditions including a depth of field and the like, and a background becomes easily blurred, for example, in a case where a subject is in focus. Further, a user may prefer an image in which the background is moderately blurred to an image in which the background is clearly captured with respect to the in-focus subject.

When the blurring of an image is evaluated, for the above reasons, the degree of blurring of the subject and the degree of blurring of the background may be calculated, respectively. An example thereof includes a blurring evaluation technique described in JP2013-12906A.

In the blurring evaluation of JP2013-12906A, the image is divided into a subject region and a background region, and an evaluation value for blurring is calculated for each region. After that, the evaluation value of each region is weighted on the basis of a depth of field of the image so that the blurring of the image is evaluated according to the depth of field. With this, it is possible to correctly evaluate whether the image is intentionally blurred or the image is blurred due to a failure in imaging.

SUMMARY OF THE INVENTION

However, in the blurring evaluation of JP2013-12906A, it is difficult to evaluate whether or not the background is moderately blurred with respect to the subject. Further, the suitable background blurring with respect to the subject may change depending on an imaging location, specifically, whether or not the imaging location is outdoors. In consideration of this point, it is required to evaluate the blurring of the image more appropriately.

The present invention has been made in view of the above circumstances, and an object of the present invention is to provide an image processing device, an image processing method, a program, and a recording medium for appropriately evaluating blurring of an image according to a background in the image.

In order to achieve the above-described object, according to an aspect of the present invention, there is provided an image processing device comprising: a processor, in which the processor acquires an image, specifies a subject region in which a main subject is captured and a background region except for the subject region, in the image, calculates a difference between a degree of blurring in the subject region and a degree of blurring in the background region, acquires information as to whether or not an imaging location of the image is outdoors, and calculates an evaluation value regarding blurring of the image on the basis of the difference and the information.

Further, in the image processing device of the aspect of the present invention, the processor may calculate the evaluation value such that the evaluation value increases as an absolute value of the difference increases.

Alternatively, the processor may calculate the evaluation value such that the evaluation value increases as a probability of the imaging location being outdoors increases.

Alternatively, the processor may calculate the evaluation value such that the evaluation value decreases as the degree of blurring in the subject region increases.

Further, in the image processing device of the aspect of the present invention, the processor may acquire a numerical value defined within a range of 0 to 1, as the information. In this case, the numerical value may increase as a probability of the imaging location being outdoors increases.

Further, the processor may acquire the numerical value for the image by using a numerical value output model that outputs the numerical value for an input image. In this case, the numerical value output model may be constructed through machine learning using training data including an image and the numerical value.

Alternatively, the processor may acquire the image to which ancillary information indicating a position of the imaging location is added, and the processor may acquire the numerical value corresponding to the ancillary information.

Further, in the image processing device of the aspect of the present invention, the processor may set a subject of which a face is detected, a subject detected by a subject detection model that detects a subject in an input image, a subject designated by a user, or a subject closest to a reference position in the image, as the main subject, and specify a region in which the main subject is captured, as the subject region.

Further, in the image processing device of the aspect of the present invention, the processor may calculate a score defined within a range of 0 to 1 as the degree of blurring in each of the subject region and the background region, and calculate the difference from the score for the subject region and the score for the background region.

Further, in the image processing device of the aspect of the present invention, the processor may divide the image into a plurality of regions, calculate the score for the subject region by calculating the score for a region corresponding to the subject region, among the plurality of regions, for each region and averaging the scores calculated for respective regions, and calculate the score for a region corresponding to the background region, among the plurality of regions, for each region. In this case, the processor may calculate the score for the background region by averaging the scores calculated for respective regions, and calculate the difference by subtracting one from the other of the score for the subject region and the score for the background region.

Further, in order to achieve the above-mentioned object, according to another aspect of the present invention, there is provided an image processing method executed by a processor, the method comprising: a step of, by the processor, acquiring an image; a step of, by the processor, specifying a subject region in which a main subject is captured and a background region except for the subject region, in the image; a step of, by the processor, calculating a difference between a degree of blurring in the subject region and a degree of blurring in the background region; a step of, by the processor, acquiring information as to whether or not an imaging location of the image is outdoors; and a step of, by the processor, calculating an evaluation value regarding blurring of the image on the basis of the difference and the information.

Further, in the image processing method of the aspect of the present invention, in the step of calculating the evaluation value, the processor may calculate the evaluation value such that the evaluation value increases as an absolute value of the difference increases.

Alternatively, in the step of calculating the evaluation value, the processor may calculate the evaluation value such that the evaluation value increases as a probability of the imaging location being outdoors increases.

Alternatively, in the step of calculating the evaluation value, the processor may calculate the evaluation value such that the evaluation value decreases as the degree of blurring in the subject region increases.

Further, the present invention also provides a program for causing a computer to execute each step of the above-mentioned image processing method.

Furthermore, the present invention provides a computer-readable recording medium, the recording medium having a program recorded thereon for causing a computer to execute each step of the above-mentioned image processing method.

According to the present invention, blurring of an image can be appropriately evaluated in consideration of a degree of blurring of each of a subject and a background in the image and whether or not the background is outdoors.

DESCRIPTION OF THE PREFERRED EMBODIMENTS

Hereinafter, a suitable embodiment of the present invention (the present embodiment) will be described in detail with reference to the accompanying drawings. It should be noted that the embodiments described below are merely an example for facilitating the understanding of the present invention, and do not limit the present invention. That is, the present invention may be modified or improved from the embodiments described below without departing from the gist of the present invention. Further, the present invention includes an equivalent thereof.

Further, in the present specification, "image" is assumed to be image data unless otherwise specified. The image data corresponds to, for example, irreversible compressed image data, such as joint Photographic Experts Group (JPEG) format, and lossless compressed image data, such as Graphics Interchange Format (GIF) or Portable Network Graphics (PNG) format.

Further, in the present specification, "machine learning" may include a neural network, a convolutional neural network, a recurrent neural network, attention, a transformer, a generative adversarial network, a deep learning neural network, a Boltzmann machine, matrix factorization, a factorization machine, an m-way factorization machine, a field aware factorization machine, a field aware neural factorization machine, a support-vector machine, a Bayesian network, a decision tree, random forests, other machine learnings, and the like.

Overview of Image Processing Device According to Present Embodiment

The image processing device (hereinafter, an image processing device 10) according to the present embodiment evaluates the blurring of an image, and presents the evaluation result to a user or determines the quality of the image according to the evaluation result. The image to be evaluated for blurring by the image processing device 10 is, for example, an image captured by the user with an imaging device, such as a digital camera, or a processed image obtained by performing processing, such as trimming or affine transformation, on an original image.

The image processing device 10 includes, for example, a computer (client terminal) operated by the user, and specifically, includes a desktop PC, a mobile terminal, such as a notebook PC, a tablet terminal, or a smartphone, or the like used by the user. The image processing device 10 may include one computer or two or more computers.

Figure 1:
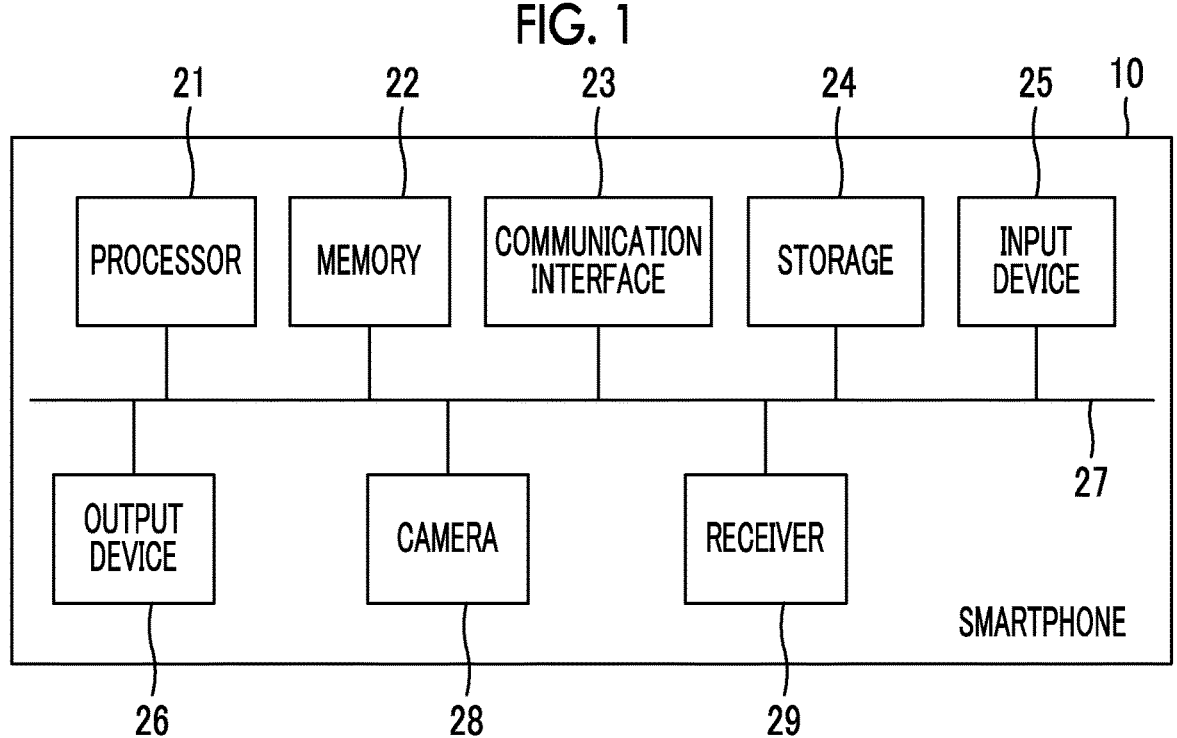
FIG. 1 is a diagram showing a configuration of an image processing device according to one embodiment of the present invention.

As shown in FIG. 1, the computer constituting the image processing device 10 has a processor 21, a memory 22, a communication interface 23, a storage 24, an input device 25, an output device 26, and the like. These devices are electrically connected to each other via a bus 27.

The processor 21 is constituted of, for example, a central processing unit (CPU), a graphics processing unit (GPU), a digital signal processor (DSP), and a tensor processing unit (TPU).

The memory 22 is constituted of a semiconductor memory, such as a read only memory (ROM) and a random access memory (RAM). A program for an operating system (OS) and an application program for image analysis (hereinafter, an image analysis application) are stored in the memory 22. These programs correspond to the "program" of the embodiment of the present invention, and these programs are executed by the processor 21 so that the computer functions as the image processing device 10.

The above-described program may be read by the computer from a recording medium on which the program is recorded, or may be acquired (downloaded) via a network, such as the Internet or a communication network.

The communication interface 23 connects the computer constituting the image processing device 10 and a device on the network so as to be communicable with each other, via the communication network, such as the Internet or a mobile network. The computer constituting the image processing device 10 requests data from the other device through the communication interface 23, and receives the data sent from the other device in response to the request.

The storage 24 includes a memory device such as a semiconductor memory, a hard disk drive (HD), a solid state drive (SSD), or the like, which is built in or externally attached to the computer constituting the image processing device 10. An external computer communicably connected to the image processing device 10 may be used as the storage 24.

The input device 25 receives a user's operation, as in a keyboard or the like. The output device 26 displays text information or an image, as in a display or the like, or outputs audio information, as in a speaker or the like.

Hereinafter, a case where the computer constituting the image processing device 10 is a smartphone will be described as an example. The smartphone has the same hardware configuration as a known smartphone, and has a display with a touch panel that is also used as the input device 25 and the output device 26.

Further, the smartphone has a built-in camera 28 (see FIG. 1), and the user can capture an image by using the camera built in the smartphone. The captured image is accumulated in the storage 24 in the smartphone, or is transmitted to a cloud service server (not shown) through the communication interface 23 and accumulated in the server.

Further, the smartphone is provided with a receiver 29 for Global Positioning System (GPS), and is equipped with a function of measuring the current position (specifically, latitude, longitude, altitude, and the like) of the smartphone. With this function, in a case where the user captures an image with the camera built in the smartphone, the position of the smartphone at that time, that is, the position of the imaging location, can be measured.

In addition, the smartphone has a function of adding ancillary information, such as tag information of exchangeable image file format (Exif), to the captured image. The ancillary information includes, for example, the position information of the imaging location measured by using the receiver 29 for GPS. The position information of the imaging location may be recorded as a separate file from the captured image as long as the position information is associated with the captured image.

In addition, the OS and the image analysis application are installed on the smartphone, and the image analysis application is activated in a case where the user performs a predetermined operation through the touch panel. After activating the application, the user performs an operation for starting the evaluation, such as selecting an image to be evaluated for blurring. Upon receiving this operation, the smartphone executes a series of processing related to image blurring evaluation.

The blurring evaluation result is output to the user by, for example, being displayed on a display or the like. With this, the user can confirm the blurring evaluation result (specifically, an evaluation value, which will be described later) for the image to be evaluated.

Regarding Function of Image Processing Device

Next, among the functions of the image processing device 10 according to the present embodiment, the functions related to the image blurring evaluation will be described with reference to FIG. 2.

Figure 2:
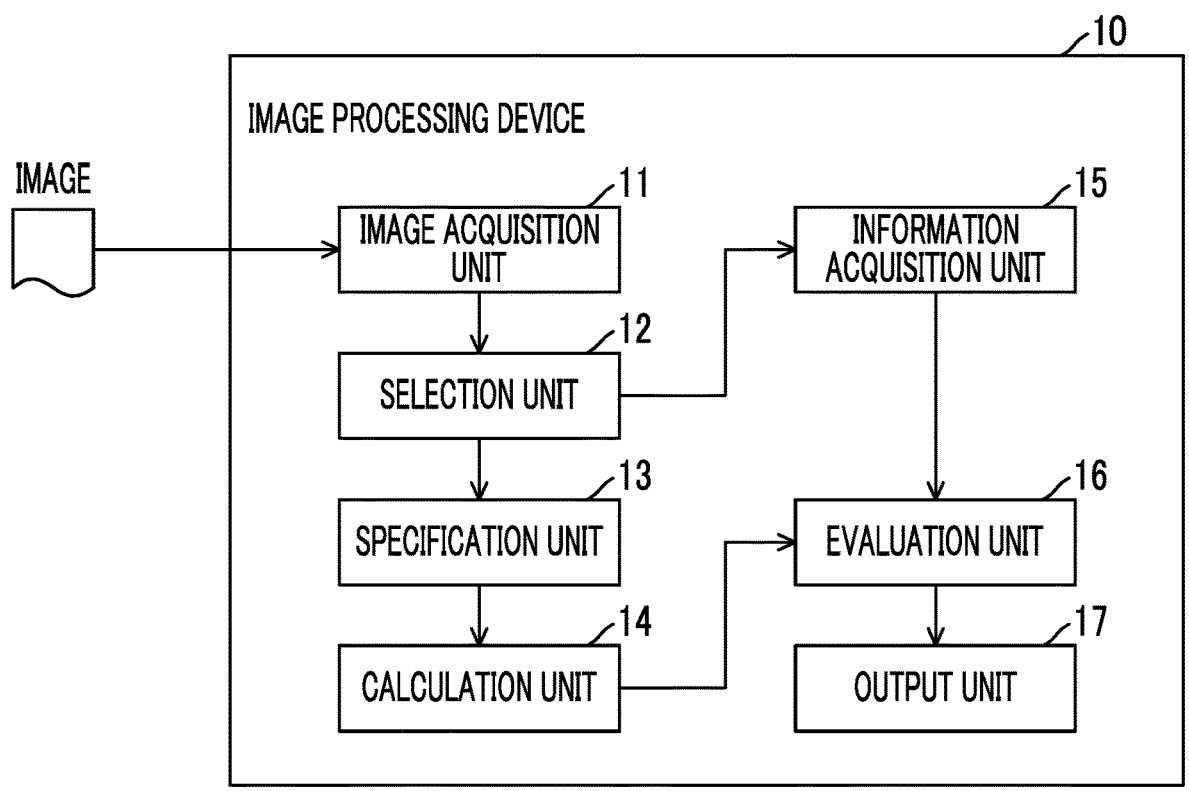
FIG. 2 is a diagram showing a function of the image processing device according to one embodiment of the present invention.

As shown in FIG. 2, the image processing device 10 has an image acquisition unit 11, a selection unit 12, a specification unit 13, a calculation unit 14, an information acquisition unit 15, an evaluation unit 16, and an output unit 17. These functional units are realized by the cooperation between the hardware device of the computer (specifically, the smartphone) constituting the image processing device 10, and the program for an OS and the image analysis application as software stored in the computer. Specifically, the processor 21 reads out the above-described program and controls each unit of the computer in accordance with the program so that the above-described functions are exhibited.

Image Acquisition Unit

The image acquisition unit 11 acquires a captured image, and specifically, acquires an image by controlling the camera 28 according to the imaging operation of the user and capturing the image. The method of acquiring the image is not particularly limited, and for example, an image may be acquired (received) from another device through the communication with the device via the network. Alternatively, an imaging device, such as a digital camera, which is a device different from the image processing device 10, captures an image, and then the image may be taken in from the device.

Selection Unit

The selection unit 12 selects an image to be evaluated for blurring (hereinafter, a target image) from among the images acquired by the image acquisition unit 11. In the present embodiment, the selection unit 12 selects the target image on the basis of a selection operation performed by the user, and specifically, among the images accumulated in the storage 24, an image selected by the user is set as the target image. It should be noted that the present invention is not limited thereto, and the selection unit 12 may set an image randomly selected from among the images accumulated in the storage 24, as the target image.

Specification Unit

The specification unit 13 specifies a subject region in which a subject (hereinafter, a main subject) selected in accordance with a predetermined selection condition is captured, and a background region except for the subject region, in the target image. The main subject is, for example, a person of which a face is detected in the target image, and the subject region is, for example, a region in which the person of which the face is detected is captured. The specification of the subject region can be realized by a known face detection technique and a known image analysis technique for estimating a person region from the detected face region.

Further, in a case where faces of a plurality of persons (strictly speaking, faces of a plurality of persons existing at substantially the same depth) are detected in the target image, a group of the plurality of persons may be the main subject.

The method of selecting the main subject and the method of specifying the subject region are not particularly limited. For example, in the target image, an object designated by the user may be selected as the main subject from among objects detected by a known object detection technique. Alternatively, the user may set a rectangular frame-shaped bounding box in the target image and select a subject in the bounding box as the main subject. In this case, in the target image, a region in which the object designated by the user is captured or a region surrounded by the bounding box is specified as the subject region, and a region except for the subject region is specified as the background region.

Further, in a case where the subject captured in the target image is an object other than a person, the object located on the foreground side of the target image may be selected as the main subject. In this case, a region in which the object located on the foreground side is captured is specified as the subject region, and a region except for the subject region is specified as the background region.

Alternatively, a subject closest to a reference position in the target image may be selected as the main subject. In this case, in the target image, a region in which the subject closest to the reference position is captured is specified as the subject region, and a region except for the subject region is specified as the background region. The reference position of the target image refers to the center position of the angle of view of the target image or the in-focus position (position in focus).

Alternatively, a subject in the target image detected by inputting the target image into a subject detection model may be set as the main subject. In this case, in the target image, a region in which the subject detected by the subject detection model is captured is specified as the subject region, and a region except for the subject region is specified as the background region. The subject detection model is a model that is constructed through machine learning, and that detects a subject (object) in an input image through a segmentation method to extract a subject having a predetermined attribute as the main subject.

Calculation Unit

The calculation unit 14 obtains a score indicating the degree of blurring for each of the subject region and the background region in the target image specified by the specification unit 13, and calculates a difference between the score in the subject region and the score in the background region. The degree of blurring indicates the degree of change in shading at the edge of the object included in each region, and reflects the edge strength. That is, the smaller the edge strength is, the larger the degree of blurring is, and the larger the edge strength is, the smaller the degree of blurring is. The edge strength is specified by applying an edge detection filter, such as a Canny Edge Detector, a Sobel filter, a Gaussian filter, or a Prewitt filter, to the image.

Figure 3:
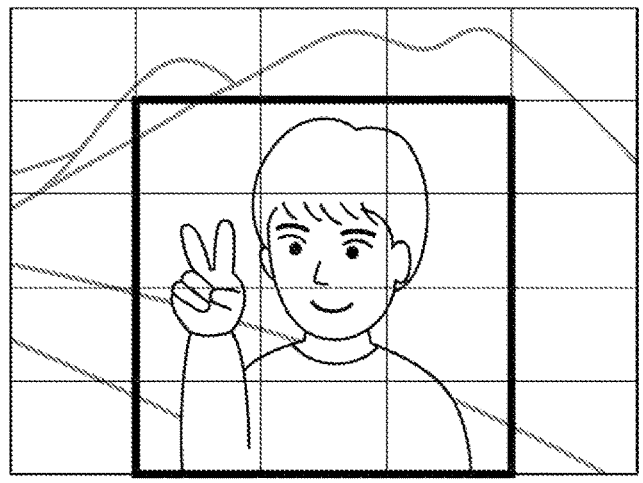
FIG. 3 is a diagram showing an example of a case where an image is divided into a plurality of regions.

The calculation unit 14 calculates the score for each of the subject region and the background region on the basis of the edge strength. Specifically, in calculating the score of each region, the calculation unit 14 divides the target image into N small regions (corresponding to a plurality of regions) as shown in FIG. 3. Each of the N small regions is a rectangular region having the same size. Then, the calculation unit 14 classifies the N small regions into a small region corresponding to the subject region and a small region corresponding to the background region. In the example shown in FIG. 3, nine small regions surrounded by a thick frame correspond to the subject region.

The number of divisions N of the image is a natural number of 3 or more, and is 25 in the case shown in FIG. 3. The number of divisions N can be arbitrarily determined, but is preferably an odd number, for example.

Then, the calculation unit 14 applies an edge detection filter to each of the N small regions to obtain the edge strength of each small region, and then calculates the score for each small region from the edge strength. With this, among the N small regions, the score is calculated for each small region for the small region corresponding to the subject region. Then, the calculation unit 14 calculates the score for the subject region by averaging the scores calculated for respective small regions.

Similarly, the calculation unit 14 calculates the score for the background region by calculating the score for each small region for the small region corresponding to the background region and averaging the scores calculated for respective small regions.

As described above, in the present embodiment, the score is calculated for each rectangular region included in each of the subject region and the background region, and the scores for respective rectangular regions are averaged, whereby the score is calculated for each of the subject region and the background region. With this, it is possible to grasp the average (averaged) degree of blurring for each of the subject region and the background region.

In the present embodiment, the score calculated for each region and the score calculated by averaging the scores for respective regions (that is, the score for each of the subject region and the background region) are both defined within a range of 0 to 1. Here, the score becomes larger and closer to 1 as the degree of blurring becomes larger, and becomes smaller and closer to 0 as the degree of blurring becomes smaller. As described above, in the present embodiment, the degree of blurring in each region is quantified as the score, so that the objectivity of the degree of blurring can be ensured, and the subsequent arithmetic processing using the score is simplified because the score is defined in the range of 0 to 1.

Then, after calculating the score for each region, the calculation unit 14 calculates the difference in score by subtracting one from the other of the score for the subject region and the score for the background region. In the present embodiment, the difference is calculated by subtracting the score for the background region from the score for the subject region.

As for the method of calculating the score for each of the subject region and the background region, a method other than the above may be used as long as the score of each region can be appropriately calculated. For example, the score is obtained for each small region by inputting, among the N small regions, each of the small regions corresponding to the subject region into a score calculation model, and the scores for respective small regions are averaged, whereby the score for the subject region may be calculated. Similarly, the score is obtained for each small region by inputting each of the small regions corresponding to the background region into the score calculation model, and the scores for respective small regions are averaged, whereby the score for the background region may be calculated.

The score calculation model is a model that is constructed through machine learning, and that outputs (estimates) the score for a small region in response to an input of the small region into the model. The machine learning for constructing the score calculation model is performed using training data including a training image and the score of the image.

The machine learning for constructing the score calculation model may be performed by a learning device different from the image processing device 10. In that case, the image processing device 10 can use the score calculation model by communicating with the learning device through the communication interface 23.

Further, in calculating the score for each of the subject region and the background region, the present invention is not limited to the case where the score is obtained for each region by dividing the target image into the N small regions, as described above. For example, each of the subject region and the subject region may be input to the above-mentioned score calculation model, whereby the score for each of the subject region and the subject region may be directly calculated.

Information Acquisition Unit

The information acquisition unit 15 acquires information as to whether or not the imaging location of the target image is outdoors (hereinafter, outdoor degree information). More specifically, the information acquisition unit 15 acquires a numerical value defined by 0 or 1, as the outdoor degree information. This numerical value reflects whether or not the imaging location is outdoors, and is 1 in a case where the imaging location is outdoors and is 0 in a case where the imaging location is indoors.

In the present embodiment, the information acquisition unit 15 acquires a numerical value corresponding to the ancillary information added to the target image, as the outdoor degree information. Specifically, the information acquisition unit 15 reads out the position information indicated by the ancillary information of the target image and specifies the position of the imaging location of the target image. After that, the information acquisition unit 15 collates the position of the specified imaging location with map data (specifically, data indicating the location of a building) stored in the storage 24, thereby determining whether the imaging location is indoors or outdoors. Then, the information acquisition unit 15 acquires a numerical value corresponding to the determination result, and specifically, acquires the numerical value "1" in a case where the determination result is outdoors and acquires the numerical value "0" in a case where the determination result is indoors.

With the above method, it is possible to appropriately and easily determine whether or not the imaging location of the target image is outdoors. It should be noted that the method of acquiring the above-described numerical value, which is the outdoor degree information, is not particularly limited, and a method other than the above may be used. For example, the numerical value for the target image may be acquired by using a numerical value output model M shown in FIG. 4. The numerical value output model M is a model that is constructed through machine learning, and that determines whether or not the imaging location of the input image is outdoors and outputs a numerical value corresponding to the determination result.

Figure 4:
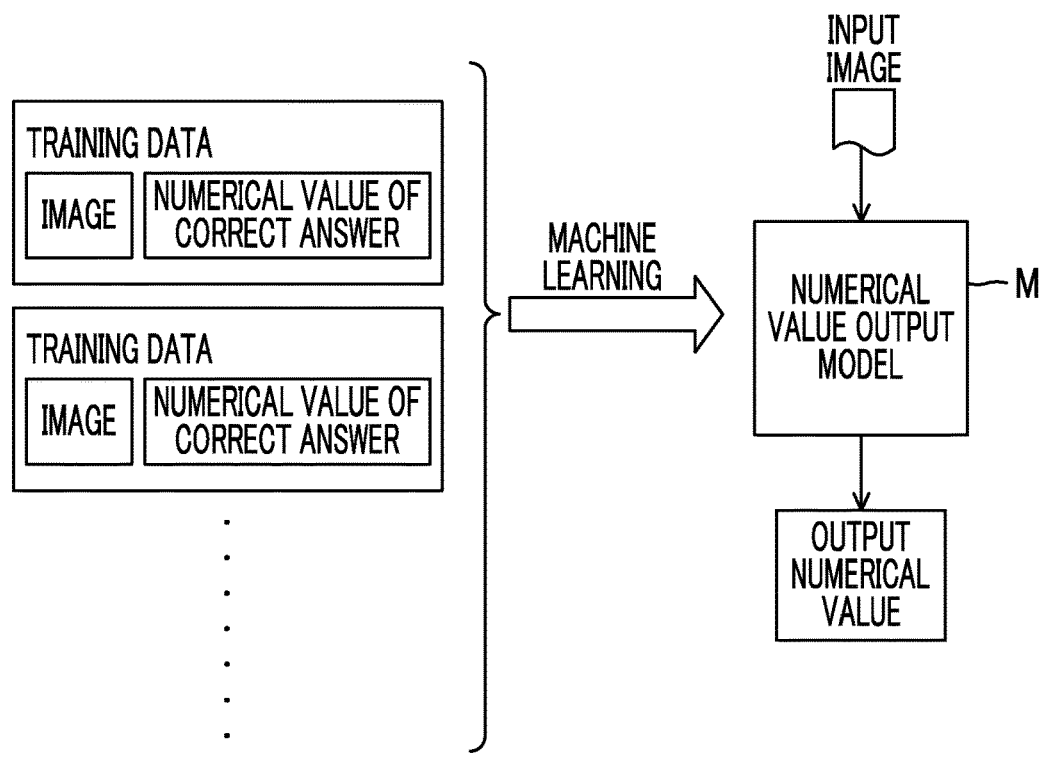
FIG. 4 is a diagram illustrating a numerical value output model.

As shown in FIG. 4, the machine learning for constructing the numerical value output model M is performed using training data including an image and a numerical value (a numerical value of 0 or 1) corresponding to the imaging location of the image. The numerical value included in the training data is so-called correct answer data, and is decided by, for example, visually observing the background of a person captured in an image and determining whether or not the background is outdoors.

The machine learning for constructing the numerical value output model M may be performed by a learning device different from the image processing device 10. In that case, the image processing device 10 can use the numerical value output model M by communicating with the above-described learning device through the communication interface 23.

As described above, in the present embodiment, the objectivity of the outdoor degree information can be ensured by quantifying the outdoor degree information, and the subsequent arithmetic processing using the outdoor degree information is simplified because the outdoor degree information is defined by a numerical value of 0 or 1.

The numerical value, which is the outdoor degree information, is not limited to the case where the numerical value is binary values of 0 and 1. For example, in a case where the calculation unit 14 acquires a numerical value using the above-described numerical value output model, the numerical value may be defined within the range of 0 to 1. In this case, the higher the probability of the imaging location being outdoors is, the larger the numerical value is, and the higher the probability of the imaging location being indoors is, the smaller the numerical value is. In this case, the validity of the numerical value is enhanced as compared with a case where the numerical value, which is the outdoor degree information, is defined by binary values of 0 and 1. As a result, the credibility of the result of the blurring evaluation based on the numerical value (specifically, the evaluation value, which will be described later) is improved.

Further, the ancillary information (tag information) added to the captured image may include information indicating whether or not the imaging location is outdoors, that is, the outdoor degree information, as information regarding the imaging location. For example, the user who is a photographer may input whether or not the imaging location is outdoors, and the input information (outdoor degree information) may be stored as the ancillary information. In that case, the information acquisition unit 15 acquires the outdoor degree information by reading out the outdoor degree information from the ancillary information added to the target image.

Evaluation Unit

The evaluation unit 16 calculates an evaluation value regarding the blurring of the target image on the basis of the score for each of the subject region and the background region calculated by the calculation unit 14, the difference in score, and the outdoor degree information acquired by the information acquisition unit 15.

Specifically, the evaluation unit 16 calculates the evaluation value regarding the blurring of the target image by using Equation (1).

$$v = \frac{(1.0 - s) + \{1.0 - (1.0 - u) \times (1.0 - |s - t|)\}}{2} \quad (1)$$

In Equation (1), v is an evaluation value regarding the blurring of the target image, s is a score for the subject region, t is a score for the background region, and u is a numerical value as the outdoor degree information.

The evaluation value v calculated by Equation (1) is an indicator related to the adequacy of blurring in the subject region and the background region, and means that the higher the evaluation value v is, the more adequate the degree of blurring is.

As can be seen from Equation (1), the evaluation unit 16 calculates the evaluation value v such that the evaluation value v increases as the absolute value of the difference in score (=s−t) increases. With this, whether or not the background region is moderately blurred with respect to the subject region can be reflected in the calculation result of the evaluation value v.

Further, the evaluation unit 16 calculates the evaluation value v such that the evaluation value v increases as the probability of the imaging location being outdoors increases (that is, the numerical value u increases). This is because the adequacy of blurring in the background region may change depending on whether the imaging location is outdoors or indoors.

Figure 5:
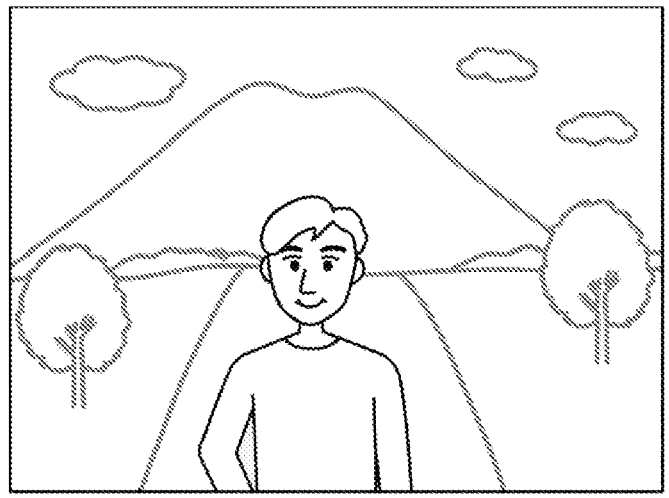
FIG. 5 is a diagram showing an example of an image to be evaluated for blurring (example 1).

More specifically, in an image captured outdoors as shown in FIG. 5, the influence of blurring of the background region on the adequacy of blurring of the image is generally small. Therefore, the evaluation value v is calculated such that the evaluation value v increases even in a case where there is no difference in the degree of blurring between the background region and the subject region, for the image captured outdoors.

Figure 6:
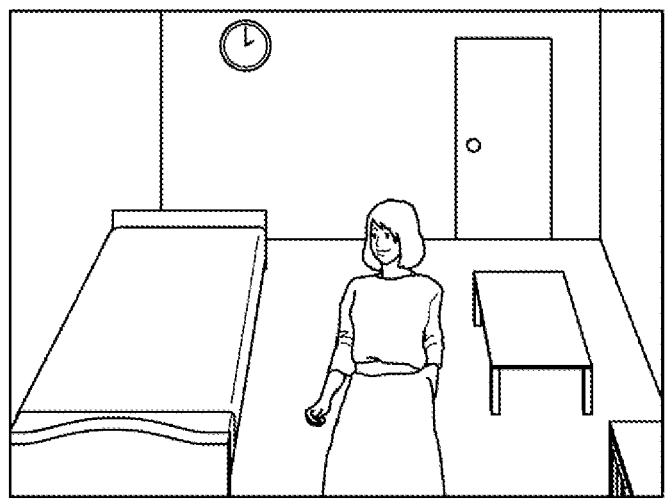
FIG. 6 is a diagram showing an example of an image to be evaluated for blurring (example 2).

On the other hand, in an image captured indoors as shown in FIG. 6, there is generally a desire to blur the background as much as possible. On the basis of this, the evaluation value v is calculated such that the evaluation value v decreases in a case where there is no difference in the degree of blurring between the background region and the subject region, for the image captured indoors.

Further, the evaluation unit 16 calculates the evaluation value v such that the evaluation value v decreases as the degree of blurring in the subject region increases (that is, the score s for the subject region). This is because the blurring of the subject is required to be as small as possible regardless of whether the imaging location is outdoors or indoors. The evaluation value v is calculated so as to reflect this point.

Equation (1) is merely an example of an equation for calculating the evaluation value v, and a calculation equation other than Equation (1) may be used as long as the evaluation value v can be calculated from the above viewpoint.

Output Unit

The output unit 17 outputs the evaluation value calculated by the evaluation unit 16 by, for example, displaying the calculation result of the evaluation value on the display. The method of outputting the evaluation value is not particularly limited, and a symbol, a mark, or the like corresponding to the evaluation value may be displayed in association with the target image (for example, around the target image or at a position superimposed on the target image).

Further, the output unit 17 may determine the quality of the image quality of the target image on the basis of the evaluation value and output the determination result.

Image Processing Method According to Present Embodiment

Next, as a procedure of the image processing method according to the present embodiment, a flow of a series of image processing (hereinafter, blurring evaluation flow) related to blurring evaluation performed by the image processing device 10 will be described.

Each step in the blurring evaluation flow described below corresponds to a constituent element of the image processing method of the embodiment of the present invention. In addition, the flow of the blurring evaluation flow described below is merely an example, and an unnecessary step may be deleted, a new step may be added, or the execution order of steps may be rearranged, within a range that does not depart from the gist of the present invention.

Figure 7:
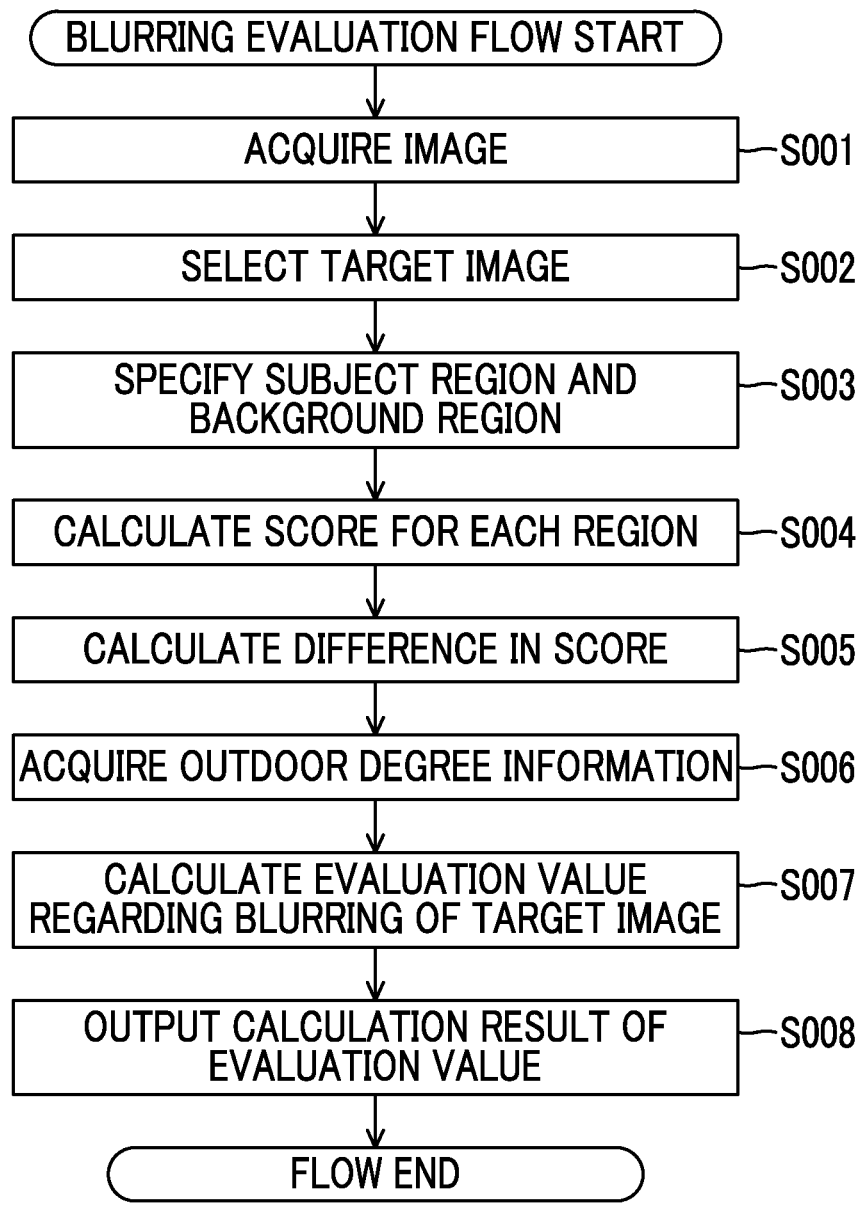
FIG. 7 is a diagram showing a procedure of an image processing method of the embodiment of the present invention.

The blurring evaluation flow proceeds according to the flow shown in FIG. 7. Further, each step in the blurring evaluation flow is performed by the processor 21 of the computer (specifically, the smartphone) constituting the image processing device 10.

In the blurring evaluation flow, first, the processor 21, specifically the image acquisition unit 11, acquires an image (S001). Specifically, the processor 21 controls the camera 28 on the basis of the imaging operation of the user to capture the image. The captured image is stored and accumulated in the storage 24.

Next, the processor 21, specifically the selection unit 12, selects the target image from among an image group accumulated in the storage 24 according to the selection operation of the user (S002).

Figure 8:
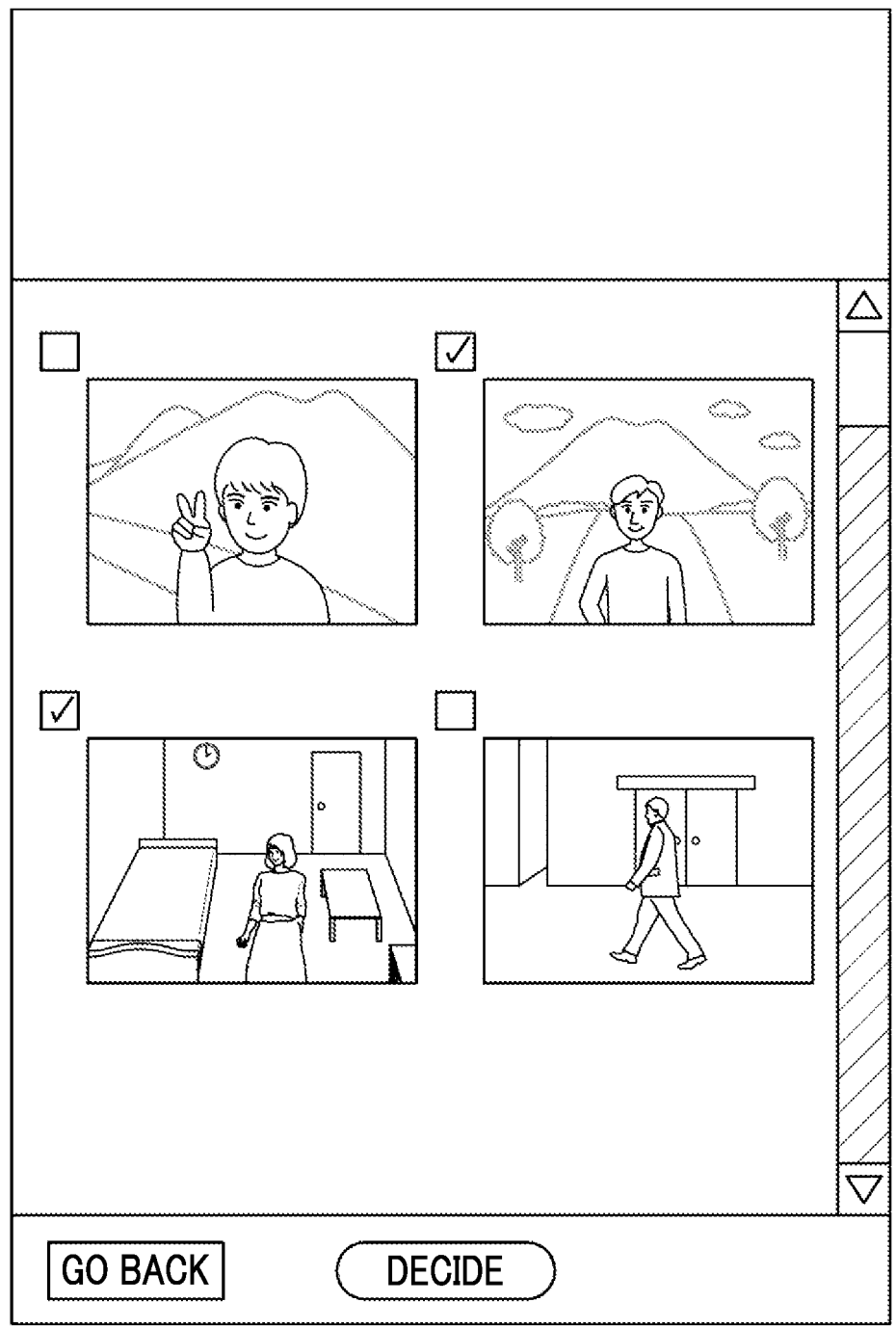
FIG. 8 is a diagram showing an example of a screen for selecting an image to be evaluated.

Specifically, the processor 21 controls the display to display a selection screen shown in FIG. 8. As shown in FIG. 8, on the selection screen, the image group (strictly speaking, a thumbnail image of each image in the image group) accumulated in the storage 24 is displayed so as to be selectable. The user selects one or two or more images as the target image from among the displayed image group, and performs an operation to touch the image on the screen, that is, performs a selection operation. The processor 21 receives the selection operation of the user and selects the selected image as the target image.

The number of target images selected may be arbitrary, and in a case where two or more target images are selected, the steps after S003 are repeatedly performed for each image.

Next, the processor 21, specifically the specification unit 13, specifies the subject region and the background region in the target image according to the above-mentioned point (S003). Specifically, for example, the processor 21 detects the face of a person captured in the target image, and sets the person of which the face is detected, as the main subject. Then, the processor 21 specifies the person region estimated from the detected face region, as the subject region, and sets a region except for the subject region as the background region.

Next, the processor 21, specifically the calculation unit 14, calculates the score indicating the degree of blurring for each of the subject region and the background region according to the above-mentioned point (S004). Specifically, the processor 21 calculates the score for the subject region by dividing the target image into N small regions, calculating the score for each small region for the region corresponding to the subject region, and averaging the scores calculated for respective small regions. Similarly, the processor 21 calculates the score for the background region by calculating the score for each small region for the small region corresponding to the background region and averaging the scores calculated for respective small regions.

After that, the processor 21 calculates the difference in score between the subject region and the background region (S005).

Next, the processor 21, specifically the information acquisition unit 15, acquires information (outdoor degree information) as to whether or not the imaging location of the target image is outdoors, according to the above-mentioned point (S006). Specifically, the processor 21 specifies the position of the imaging location of the target image from the ancillary information of the target image, collates the position of the imaging location with the map data, and determines whether or not the imaging location is outdoors. Then, the processor 21 acquires a numerical value (specifically, a numerical value of 0 or 1) decided according to the determination result, as the outdoor degree information.

Next, the processor 21, specifically the evaluation unit 16, calculates the evaluation value regarding the blurring of the target image on the basis of the score for each of the subject region and the background region, the difference in score therebetween, and the numerical value which is the outdoor degree information. (S007).

Specifically, the processor 21 calculates the evaluation value v regarding the blurring of the target image by using Equation (1). That is, in step S007, the processor 21 calculates the evaluation value v such that the evaluation value v increases as the absolute value of the difference in score increases. Further, the evaluation value v is calculated such that the evaluation value v increases as the probability of the imaging environment of the target image being outdoors increases.

Figures 9, 10:
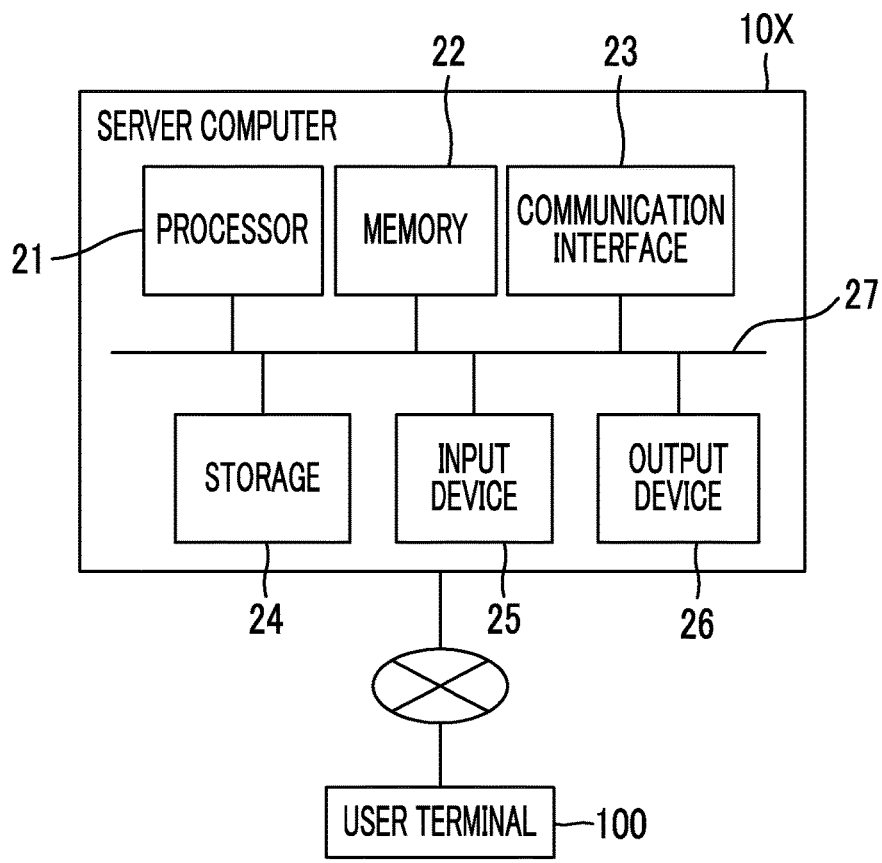
FIG. 9 is a diagram showing an example of a calculation result of an evaluation value regarding blurring of the image.
FIG. 10 is a diagram showing a configuration of an image processing device according to another embodiment of the present invention.

The evaluation value v of the target image is calculated through the above procedure. An example of the calculation result of the evaluation value v is shown in FIG. 9. Among the examples shown in FIG. 9, the evaluation value v of a target image A is relatively large. This is because the target image A is an image captured outdoors and the degree of blurring is small in both the subject region and the background region.

On the other hand, for a target image B, the evaluation value v is relatively small, although the degree of blurring in each of the subject region and the background region is small. This is because the target image B is an image captured indoors and the background is not sufficiently blurred with respect to the subject.

The evaluation value v of each of target images C and D is relatively large. This reflects that the absolute value of the difference in score is large, specifically, the subject region is in focus, and the background is appropriately blurred with respect to the subject.

For each of target images E to H, the evaluation value v is relatively small regardless of the difference in score and the numerical value of the outdoor degree information. This is because the degree of blurring of the subject region is significantly large.

After the evaluation value is calculated, the processor 21, specifically the output unit 17, outputs the calculated evaluation value by, for example, displaying the evaluation value on the display (S008).

Then, when step S008 is completed, the blurring evaluation flow ends.

Other Embodiments

Although the image processing device, the image processing method, the program, and the recording medium of the embodiment of the present invention have been described above with specific examples, the above-mentioned embodiment is merely an example, and other embodiments may be considered.

In the above-mentioned embodiment, the case where the series of image processing related to the blurring evaluation is executed independently has been described as an example, but the present invention is not limited thereto. The above-mentioned image processing related to the blurring evaluation may be executed incidentally to other processing related to images, for example, processing of ordering image printing, or processing of creating a photo album in which a plurality of images are disposed in a predetermined layout.

Further, in the above-mentioned embodiment, as an example of the image processing device, a computer including a processor, specifically, a computer (client terminal) used by a user has been described as an example. It should be noted that the location of the processor provided in the image processing device of the embodiment of the present invention is not limited to the computer on the user side, and may be provided anywhere. For example, the processor 21 may be provided in a server computer, as shown in FIG. 10.

The configuration shown in FIG. 10 will be described. A server computer (hereinafter, server) constituting an image processing device 10X has the same function as the image processing device 10 according to the above-mentioned embodiment, that is, the functional units shown in FIG. 2.

Further, as shown in FIG. 10, the server is connected to a computer on the user side (hereinafter, a user terminal 100) so as to be communicable with each other.

The server receives and acquires an image transmitted from the user terminal 100, and stores and accumulates the acquired image in a storage device in the server. Further, in a case where the server receives the execution request of the blurring evaluation from the user terminal 100, the server analyzes the execution request and specifies the target image from the image group accumulated in the server. After that, the server executes a series of image processing related to the blurring evaluation of the specified target image, and calculates the evaluation value for the blurring of the target image. Furthermore, the server outputs the calculation result of the evaluation value and transmits the output data to the user terminal 100. The evaluation value calculated by the server is displayed on the user terminal 100 side.

Although not particularly shown, the processor of the image processing device of the embodiment of the present invention may be provided in each of the server and the user terminal 100. Further, in a case where a plurality of processors exist, the plurality of processors may cooperate with each other.

The processor provided in the image processing device of the embodiment of the present invention includes various processors. Various processors include, for example, a CPU which is a general-purpose processor that executes software (program) to function as various functional units.

Further, various processors include a programmable logic device (PLD) which is a processor of which the circuit configuration can be changed after manufacture, such as a field programmable gate array (FPGA).

Furthermore, various processors include, for example, a dedicated electrical circuit which is a processor having a dedicated circuit configuration designed to perform specific processing, such as an application specific integrated circuit (ASIC).

Further, one functional unit provided in the image processing device of the embodiment of the present invention may be composed of one of the above-mentioned various processors, or a combination of two or more processors of the same type or different types, for example, a combination of a plurality of FPGAs or a combination of FPGA and CPU.

Alternatively, the plurality of functional units provided in the image processing device of the embodiment of the present invention may be composed of one of various processors, or two or more of the plurality of functional units may be collectively composed of one processor.

Alternatively, as in the above-mentioned embodiment, one or more CPUs and software are combined to constitute one processor, and the processor may function as the plurality of functional units.

Alternatively, an aspect may also be adopted in which a processor that realizes the functions of the entire system including the plurality of functional units in the image processing device with one integrated circuit (IC) chip is used, for example, as typified by a system on chip (SoC). Alternatively, the hardware configuration of the above-mentioned various processors may be an electrical circuit (circuitry) in which circuit elements, such as semiconductor elements, are combined.

EXPLANATION OF REFERENCES 10, 10X: image processing device
11: image acquisition unit
12: selection unit 13: specification unit
14: calculation unit
15: information acquisition unit
16: evaluation unit
17: output unit
21: processor
22: memory
23: communication interface
24: storage
25: input device
26: output device
27: bus
28: camera
29: receiver
100: user terminal
M: numerical value output model

What is claimed is:

1. An image processing device comprising:
a processor,
wherein the processor
acquires an image,
specifies a subject region in which a main subject is captured and a background region except for the subject region, in the image,
calculates a difference between a degree of blurring in the subject region and a degree of blurring in the background region,
acquires information as to whether or not an imaging location of the image is outdoors, and
calculates an evaluation value regarding blurring of the image on the basis of the difference and the information.

2. The image processing device according to claim 1, wherein the processor calculates the evaluation value such that the evaluation value increases as an absolute value of the difference increases.

3. The image processing device according to claim 1, wherein the processor calculates the evaluation value such that the evaluation value increases as a probability of the imaging location being outdoors increases.

4. The image processing device according to claim 1, wherein the processor calculates the evaluation value such that the evaluation value decreases as the degree of blurring in the subject region increases.

5. The image processing device according to claim 1, wherein the processor
acquires a numerical value defined within a range of 0 to 1, as the information, and
the numerical value increases as a probability of the imaging location being outdoors increases.

6. The image processing device according to claim 5, wherein the processor acquires the numerical value for the image by using a numerical value output model that outputs the numerical value for an input image, and
the numerical value output model is constructed through machine learning using training data including an image and the numerical value.

7. The image processing device according to claim 5, wherein the processor acquires the image to which ancillary information indicating a position of the imaging location is added, and
the processor acquires the numerical value corresponding to the ancillary information.

8. The image processing device according to claim 1, wherein the processor sets a subject of which a face is detected, a subject detected by a subject detection model that detects a subject in an input image, a subject designated by a user, or a subject closest to a reference position in the image, as the main subject, and specifies a region in which the main subject is captured, as the subject region.

9. The image processing device according to claim 1, wherein the processor calculates a score defined within a range of 0 to 1 as the degree of blurring in each of the subject region and the background region, and calculates the difference from the score for the subject region and the score for the background region.

10. The image processing device according to claim 9, wherein the processor
divides the image into a plurality of regions,
calculates the score for the subject region by calculating the score for a region corresponding to the subject region, among the plurality of regions, for each region and averaging the scores calculated for respective regions,
calculates the score for the background region by calculating the score for a region corresponding to the background region, among the plurality of regions, for each region and averaging the scores calculated for respective regions, and
calculates the difference by subtracting one from the other of the score for the subject region and the score for the background region.

11. An image processing method executed by a processor, the method comprising:
a step of, by the processor, acquiring an image;
a step of, by the processor, specifying a subject region in which a main subject is captured and a background region except for the subject region, in the image;
a step of, by the processor, calculating a difference between a degree of blurring in the subject region and a degree of blurring in the background region;
a step of, by the processor, acquiring information as to whether or not an imaging location of the image is outdoors; and
a step of, by the processor, calculating an evaluation value regarding blurring of the image on the basis of the difference and the information.

12. The image processing method according to claim 11, wherein in the step of calculating the evaluation value, the processor calculates the evaluation value such that the evaluation value increases as an absolute value of the difference increases.

13. A computer-readable recording medium, the recording medium having a program recorded thereon for causing a computer to execute each step of the image processing method according to claim 12.

14. The image processing method according to claim 11, wherein in the step of calculating the evaluation value, the processor calculates the evaluation value such that the evaluation value increases as a probability of the imaging location being outdoors increases.

15. A computer-readable recording medium, the recording medium having a program recorded thereon for causing a computer to execute each step of the image processing method according to claim 14.

16. The image processing method according to claim 11, wherein in the step of calculating the evaluation value, the processor calculates the evaluation value such that the evaluation value decreases as the degree of blurring in the subject region increases.

17. A computer-readable recording medium, the recording medium having a program recorded thereon for causing a computer to execute each step of the image processing method according to claim 16.

18. A computer-readable recording medium, the recording medium having a program recorded thereon for causing a computer to execute each step of the image processing method according to claim 11.

* * * * *